(12) United States Patent
Hoepman et al.

(10) Patent No.: US 6,347,373 B1
(45) Date of Patent: Feb. 12, 2002

(54) METHOD AND DEVICE FOR THE PROTECTED STORAGE OF DATA FROM MESSAGE TRAFFIC

(75) Inventors: Jaap Henk Hoepman, Groningen; Saskia Maria Josefina Gerarda Neuijen, Nieuw Vennep; Christianus Wilhelmus Henricus Maria Aldenhuijsen, Den Haag; Johannes Marinus Antonius Camps, Groningen; Paul Landsmeer, Den Haag; Johannes Hubertus Gerardus Van Pol, Leidschendam; Jean Andreas Petronius Theunissen, Rijswijk, all of (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 09/186,695

(22) Filed: Nov. 6, 1998

(30) Foreign Application Priority Data

Nov. 6, 1997 (NL) .............................................. 1007472

(51) Int. Cl.$^7$ .............................................. G06F 1/24
(52) U.S. Cl. ........................ 713/168; 713/169; 713/176; 713/178; 380/277; 380/282
(58) Field of Search ................................ 380/277, 282, 380/30; 713/168, 169, 176, 178, 182, 200, 201

(56) References Cited

U.S. PATENT DOCUMENTS

| | | | |
|---|---|---|---|
| 5,136,648 A | | 8/1992 | Olson et al. |
| 5,315,658 A | | 5/1994 | Micali |
| 5,369,705 A | * | 11/1994 | Bird et al. ..................... 380/21 |
| 5,475,757 A | * | 12/1995 | Kelly ........................... 380/24 |
| 5,546,463 A | * | 8/1996 | Caputo et al. ................. 380/25 |
| 5,555,309 A | * | 9/1996 | Kruys .......................... 380/21 |
| 5,588,059 A | * | 12/1996 | Chandos et al. ............... 380/21 |

OTHER PUBLICATIONS

Menezes et al., "Handbook of Applied Crytography", 1996, pp. 321–322, 330—331, 397–400, 545, 547–550.*

* cited by examiner

Primary Examiner—Thomas R. Peeso
(74) Attorney, Agent, or Firm—Young & Thompson

(57) ABSTRACT

Method and processor (12) for:
a. setting up a telecommunication link between various communication appliances (1, 2, 3, 7, 8, 9);
b. setting up a monitoring link (13) between the telecommunication link and the processor (12);
c. the storage in enciphered form of a first identity of either a first user of a first communication appliance (1, 2, 3) or of the first communication appliance (1, 2, 3) and a second identity of either a second user of a second communication appliance (7, 8, 9) or of the second communication appliance (7, 8, 9);
d. the storage of the data despatched via the telecommunication link, which data have been enciphered prior to the storage using a symmetrical conversation key;
e. the storage of the conversation key enciphered using public keys of the users;
f. the signing of the data stored using the symmetrical conversation key and also of the first and second identities stored in enciphered form.

22 Claims, 3 Drawing Sheets

METHOD AND DEVICE FOR THE PROTECTED STORAGE OF DATA FROM MESSAGE TRAFFIC

BACKGROUND OF THE INVENTION

The present invention relates to the protected storage of data from message traffic. Said message traffic may comprise a call between two or more individuals who each make use of a telephone or other communication appliance. The data may, however, also be derived from a communication which is recorded by a user of a telephone on a tape of another individual. Finally, the data may be derived from completely digital message traffic which takes place between two or more automatically functioning appliances which exchange data without direct intervention of individuals.

DESCRIPTION OF THE RELATED ART

The International Patent Application WO/A-96/10314 describes a method and a device for communicating between two telecommunication appliances, for example fax machines or telephones. Use for E-mail is also claimed. Said patent application proceeds from the problem that message traffic between two telecommunication appliances has sometimes to be certified so that it can later be proved that the respective message traffic has taken place on a certain date and at a certain time. The device is provided with a matrix switch which is arranged between the two mutually communicating telecommunication appliances. With the aid of the matrix switch, a three-party call can be organized between the two telecommunication appliances and certification means. To that end, one of the parties makes a request that will be handled by the matrix switch. After such a three-party call has been set up, the contents of the message traffic will also be passed to the certification means, where the contents are provided with delivery attributes. Such delivery attributes may comprise the telephone number of the telecommunication appliances, the date and the time. The certification means ensure that the contents of the message traffic are provided with such attributes and then despatched to the individual who has involved the service. This takes place in the form of, for example, paper copies of the contents of the message traffic to which the attributes have been attached. Such papers are then despatched to the individual who has involved the service via the normal post.

A disadvantage of the known device and the service thereby provided is that no measures have been taken for the reliable protection of the contents of the message traffic. There are too many ways of subsequently manipulating the contents of the message traffic or the attributes. If paper copies of the contents of the message traffic have later to serve as evidence, declarations made under oath by employees of, for example, the certification means will therefore still be necessary.

U.S. Pat. No. 5,629,982 discloses a method of transmitting and receiving messages between two or more parties via an electronic communication route. The object of this known method is to arrange for the communication to proceed in such a way that all the parties are certain of the actions taken. After the communication has ended, each sender of a message is certain that the recipient has received the message, while the recipient is certain that he has received the correct message. The method described may be used, for example, in the electronic conclusion of a contract, in which both parties wish to receive a copy, "signed" by the other party, more or less at the same time. For this purpose, the method makes use of a reliable third party ("trusted third party"). In this connection, said reliable third party is an intermediary between the communicating parties and interrupts the direct communication between the parties. For messages of short duration this may be a good option, but for calls of longer duration or message traffic of longer duration, indirect communication is impractical. In addition, said U.S. patent specification does not relate to safe storage of calls or messages, for example with a date/time stamp.

The company VoiceLog LLC, 9509 Hanover South Trail, Charlotte, N.C. 28210, offers via the Internet (www.voicelog.comm) a service for the automatic storage of the contents of a call. The call takes place between two parties, the VoiceLog system being added as third party in a three-party conference call. The VoiceLog system can be added in this way by both of the two parties. The VoiceLog system provides the individual involving the service with a unique record ID number which is a reference to the memory location within the VoiceLog system where the contents of the call are stored and where the contents can therefore be retrieved again later. The individual involving the service provides the system with an authorization code with which he has to identify himself later in order to be able to request the contents. A disadvantage of the known system is that the use of a conference call is necessary for this purpose, which is more expensive than a normal call. A further disadvantage is that only the identity of the individual involving the service is recorded and not that of the other party. In addition, the individual involving the service can later acquire access to the contents of the call and has the possibility of altering the contents subsequently, which is often undesirable. Finally, it is not ensured that the contents of the call are not accessible later for the VoiceLog system.

U.S. Pat. No. 5,136,643 describes a method and a device for applying a digital date/time stamp to a digital document. Making use of a "digital notary" is dismissed in said document as impractical. A device is described with which an owner of a digital document can apply the desired date/time stamp himself. The device itself is attacker-proof insofar as any attempt to manipulate the clock present in it will not remain unnoticed because of the physical damage to the device necessary for that purpose. The method described for applying the digital date/time stamp makes use of known elements, such as the generation of random numbers, secret private keys, public keys, digital signatures, the creation of a "hash" of a document to be stamped (in U.S. Pat. No. 5,136,643, a "hash" is defined as a unidirectional coding with a fixed length of the document), etc. The device and method described do not relate to protected storage with date/time stamp of electronic calls between two or more callers.

Various publications relate to the provision of a date/time stamp on a document which occupies a certain position in a series, for example diary entries or entries in a laboratory logbook. In this connection, it is important that the date and time of the entries are recorded unambiguously and that they cannot be altered unnoticed. Systems and procedures for this purpose are described, for example, in U.S. Pat. No. 5,189,700 and U.S. Pat. No. 5,347,579. With the aid of cryptographic procedures, including digital signatures, private keys, public keys, the calculation of a "hash" of the document to be provided with a stamp, the desired data, including the author of the document, the date/time, the document and an ID of the appliance which has applied the stamp are recorded.

A method of identifying a user of a system with the aid of a voice password check is disclosed, for example, in EP-A-0,444,351.

SUMMARY OF THE INVENTION

The object of the present invention is the incontestable and reliable recording of the contents of message traffic with authentication of either the participants in the message traffic which takes place via a telecommunication link or of one or more of the respective communication appliances used.

A further object of the invention is that such recorded message traffic cannot be played back later by individuals other than the parties without the collaboration and agreement of at least one of the parties. In addition, an object is to ensure that the recorded contents cannot be altered later.

To fulfil said object, the invention relates to a method for protected storage of data from message traffic taking place between at least two communication appliances, comprising the following steps:

a. the setting-up of a telecommunication link between at least a first communication appliance and a second communication appliance;
b. the setting-up of a monitoring link between the telecommunication link and telecommunication means of a third party;
c. the storage of a first identity of either a first user of the first communication appliance or of the first communication appliance and a second identity of either a second user of the second communication appliance or of the second communication appliance by the telecommunication means of the third party;
d. the storage of the data despatched via the telecommunication link by the telecommunication means of the third party, characterized in that the following steps are carried out:
e. the encipherment of the data prior to the storage in step d. using a symmetrical conversation key;
f. the storage of the conversation key enciphered using public keys of the users by the telecommunication means of the third party;
g. the signing of data stored using the symmetrical conversation key and also of the stored first and second identities by the telecommunication means of the third party.

In the method defined above, "monitoring link" must be interpreted in such a way that the telecommunication means of the third party are capable of receiving the data from the message traffic between the first and second communication appliances. Said data from the message traffic are stored in enciphered form using a symmetrical conversation key, as defined in point d.

The encipherment using such a symmetrical conversion key can be carried out in a first embodiment by the telecommunication means of the third party. In an alternative method, the data from the message traffic are, however, already enciphered using the symmetrical conversion key by the communication appliances participating in the call themselves. In this latter option, although the telecommunication means of the third party can therefore "monitor", but said means can themselves never gain access to the data because the data are despatched back and forth only in enciphered form using the symmetrical conversion key via the telecommunication link set up. This option therefore gives added protection against unauthorized "monitoring". Of course, this option does require some intelligence in the communication appliances used because they have to be capable of bringing about said encipherment using such a symmetrical conversation key.

Under point c. above, it is stated that either the identities of the participants in the call or the identities of the communication appliances participating in the call are stored in enciphered form. The identification of the participants in the call gives, of course, a higher degree of security than the recording of the identity of the communication appliances used.

Moreover, it is defined under point e. above, that the data despatched during the message traffic are enciphered prior to the storage using a symmetrical conversation key. Said symmetrical conversation key will have to be as unique as possible for the stored call. As defined under point f., the symmetrical conversation key associated with every call will be stored in enciphered form using public keys of the users after termination of the call itself. This measure provides the guarantee that only the participants in the call are able to play back the contents of the stored call later.

Under point g. it is specified that, after termination of the call, all the stored data are signed by the telecommunication means of the third party. The third party is therefore a party trusted by all the participants in the call who exercises the function of a notary with an authenticated signature. The measures specified under g. prevent anyone from being able to alter the contents of the stored data later.

In an alternative embodiment, the method is characterized by the following steps:
c'. in step c., the date and the time of the message traffic are in addition stored in enciphered form;
g'. in step g., the enciphered stored date and time are in addition signed by the telecommunication means.

The addition of the date and the time at which the message traffic takes place to the enciphered stored data is desirable in many cases in order to be able to prove later when the call took place.

In order to reduce the amount of stored data, in a further embodiment, in step g., a hash can be generated by the telecommunication means over the data stored with a symmetrical conversation key and also the first and second identities stored in enciphered form, after which the hash is signed by the telecommunication means. Within the scope of the present invention, a hash is defined as follows:

A hash function h is a function which calculates for any digital file (or message or text) M, a shorter digital hash code h(M) (possibly of predetermined length), to which the following apply:

Given the message M, the hash code h(M) is simple to calculate.

Given a hash code h', it is virtually impossible to find, within a reasonable time a message M which is such that h(M)=h'.

Given a message M, it is virtually impossible to find, within a reasonable time, a message M' which is such that the hash code for M is equal to that of M'.

In the case where the date and the time are also stored, such a hash will also extend over the date and the time.

In order to increase the degree of protected storage still further, the method is characterized in a further embodiment by the following further step:
h. the signing by the at least first communication appliance and second communication appliance with private keys of the data stored using the symmetrical conversation key and also of the first and second identities stored in enciphered form, after which the telecommunication means of the third party stores all of the data thus signed.

In this connection, it is pointed out that the private key is associated with a user as an individual or with a device used, for example a chip card.

In step h., too a hash can first of all be generated by the telecommunication means over the data stored using the symmetrical conversation key and also the first and second identities stored in enciphered form, after which the hash is signed by the at least first and second communication appliances using the private keys.

Similar measures can also be taken if the date and time are stored in enciphered form.

In the case where the communication appliances themselves already communicate with one another with data enciphered by themselves using a symmetrical conversation key, the symmetrical conversation key, after having been enciphered using public keys of the users, is despatched, prior to step f. defined above from the first and second communication appliances to the telecommunication means of the third party.

As stated above, in a further embodiment, the telecommunication means will only provide access to any of the stored data to any user who identifies himself in the correct manner. Identification may take place by means of a private key, speaker verification, access code, etc. Biometric signals can also be used for identification of individuals.

The invention furthermore relates to processor means which are equipped to:
a. set up a telecommunication link between at least a first communication appliance and a second communication appliance;
b. set up a monitoring link between the telecommunication link and the processor means;
c. store a first identity of either a first user of the first communication appliance or of the first communication appliance and a second identity of either a second user of the second communication appliance or of the second communication appliance;
d. store data despatched via the telecommunication link, characterized in that the processor means are also equipped to:
e. encipher the data using a symmetrical conversation key prior to the storage in step d.;
f. store the conversation key enciphered using public keys of the users;
g. sign the data stored using the symmetrical conversation key as well as the stored first and second identities.

BRIEF DESCRIPTION OF THE DRAWINGS

The invention will be explained in greater detail below by reference to some figures which are intended only to illustrate the invention in more detail but not to restrict its scope.

DESCRIPTION OF THE PREFERRED EMBODIMENTS

Figure 1:
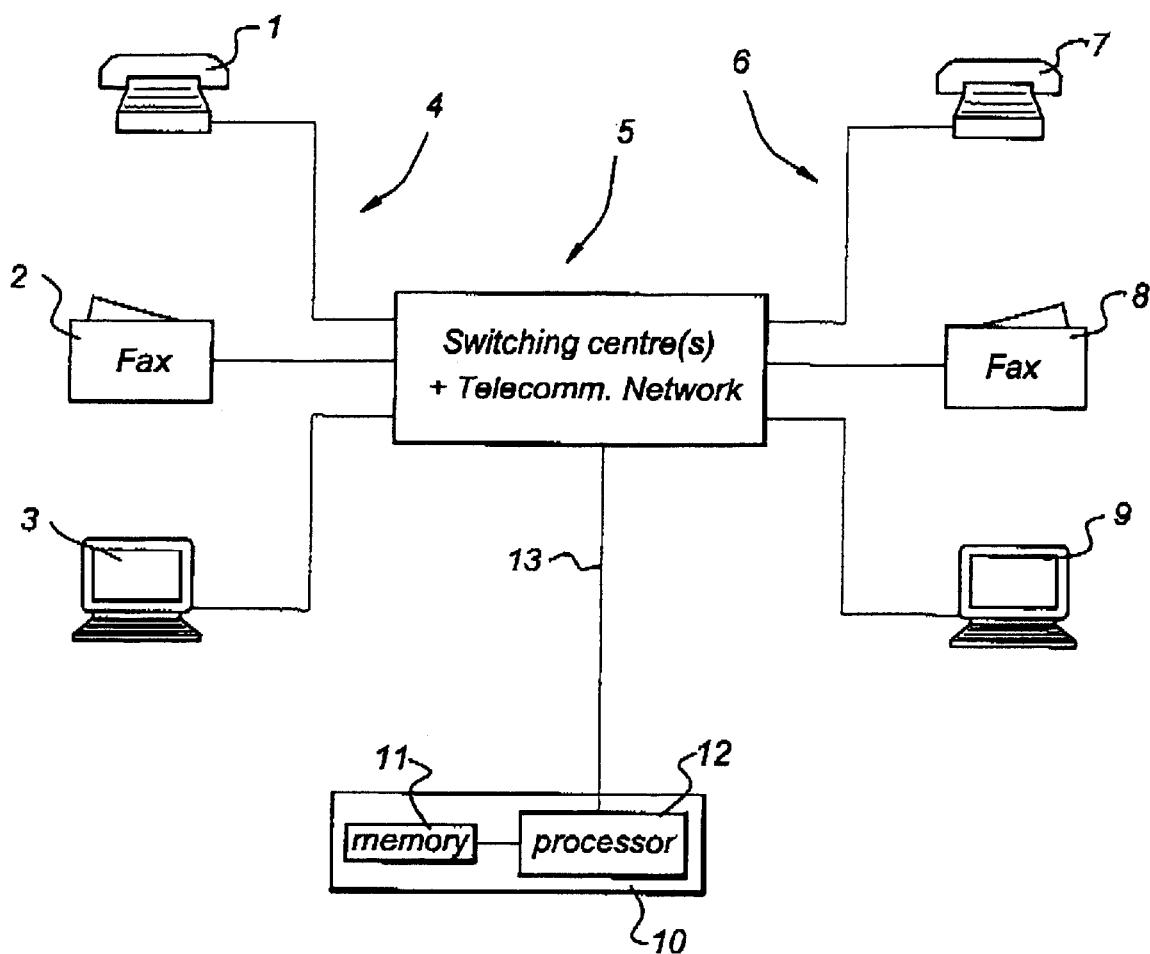
FIG. 1 diagrammatically shows a system for the communication of messages between various types of communication appliances.

FIG. 1 shows a system with which incontestable and reliable recording of data from a telecommunication call by an independent third party is possible.

In FIG. 1, the reference numerals 1 and 7 refer to telephone sets, the reference numerals 2 and 8 to fax machines and the reference numerals 3 and 9 to (personal) computers. All these appliances are connected to a telecommunication network 5. The apparatuses 1, 2, 3 are installed, for example, at a user's premises and are connected to the telecommunication network 5 via links 4. The apparatuses 7, 8 and 9 are set up, for example at a second user's premises and are connected to the telecommunication network 5 by links 6. The telecommunication network comprises switching centres not shown. All possible types of communication channels, both via telephone cables and via wireless links, may be associated with the telecommunication network.

For the purpose of the invention, the manager of the telecommunication network, PTT Telecom in the Netherlands, is equipped with telecommunication means 10 which comprise, inter alia, a processor 12 and a memory 11 connected thereto. The processor 12 is capable of setting up a link 13 to the telecommunication network in such a way that a call between one of the appliances 1, 2, 3, on the one hand, and one of the appliances 7, 8 and 9, on the other hand, can be monitored. The term "monitor" should not be interpreted here as monitoring a call between two parties who are communicating with one another via the telecommunication network without the agreement of one of the two parties. For the service according to the invention, it is specifically of importance that all the parties participating in a call consent to the monitoring by the telecommunication means 10. The processor 12 is equipped to store the monitored message traffic digitally in memory 11. If the message traffic contains analogue signals (for example, speech), an analogue/digital conversion must first be carried out.

It is pointed out that FIG. 1 shows a telephone, a fax and/or a (personal) computer as possible communication appliances of the users. This is not intended to be exhaustive. All other communication means are also expressly associated with the present invention. A further alternative is, for example, an E-mail box of one of the parties. As used in the scope of the invention, the term "call" must therefore also be interpreted widely. The term "call" refers to any form of communication between two or more communication appliances. The call may take place in one direction, i.e. one of the parties only receives a message and does not have to acknowledge it and also does not have to respond to it immediately. This is, for example, the case if a participant deposits a message in the E-mail box of another individual. It is, however, important that calls are involved which take place via the public telecommunication network.

The proposed service relates to the archiving of message traffic. The purpose is to record a call with verification of the identity of the parties so that it can later be incontestably demonstrated that the parties have in fact made the recorded call. Optionally, the call may be provided with a date and time stamp. The information must be stored in such a way that only the parties can request the stored information at a later time. The manager of the telecommunication means 10 is an independent third party who is trusted by all the parties to store the desired data. The storage must, however, be such that the manager of the telecommunication means 10 cannot view the stored data without the consent of one of the parties.

Although FIG. 1 shows the situation in which two users communicate with one another, it goes without saying that the invention also relates to any telecommunication link between two or more parties. The invention is expressly also applicable, for example, to video-conference calls.

Figure 2:
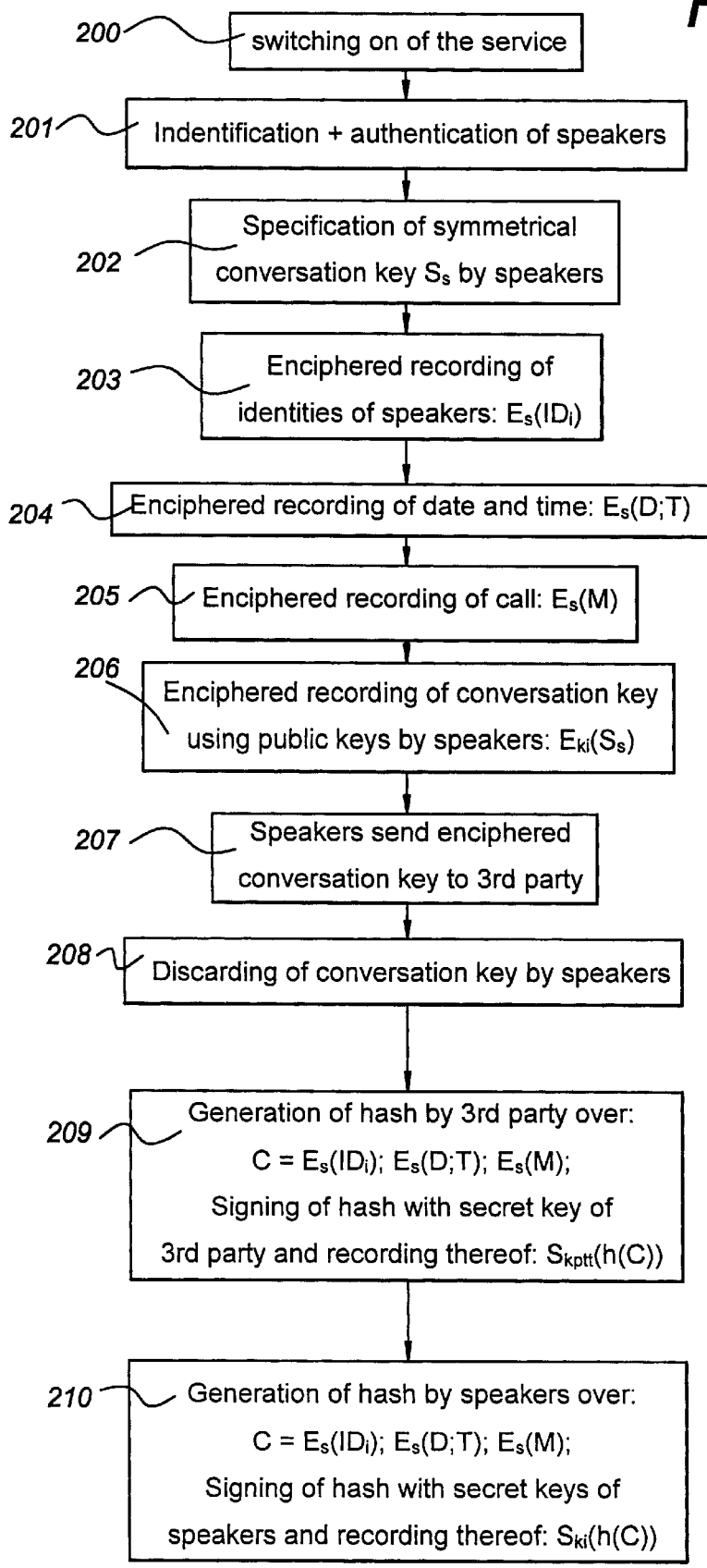
FIG. 2 shows a block diagram of an embodiment of the method according to the invention, in which the symmetrical conversation key used by the participants in the call is specified.

FIG. 2 shows a first embodiment of a method according to the invention in the form of a flow chart.

After a call has been set up between two or more parties via the telecommunication network 5, at least one of the parties must be able to give commands in order to be able to start the respective service. This is technically achievable by making use of the keys on any standard telephone set. The same applies to a fax machine or a (personal) computer. Instead of this, it is conceivable to make use of a spoken command of one of the parties. Moreover, an option is to install separate interfaces, although such a solution will make the service markedly more expensive. The service can be started at any time during a call.

As soon as the parties have instructed the telecommunication means 10 to activate the respective service (step 200), said means reports this to the other party(ies). The other party(ies) may be asked to agree to the recording of the contents of the call. Again, the other party can also do this with the aid of his keys on his telephone set, his fax machine or his (personal) computer and the like. Automatic declaration of agreement is also an option, a telecommunication appliance being preprogrammed to despatch a signal to declare agreement automatically after a request for it.

In step 201, the actual identification and the authentication of the parties takes place. Authentication is understood here as meaning the verification of the claimed identity of the parties. This is necessary for the onus of proof if it has to be established later who the parties to the call were. In addition, the subsequent access to the stored data must be protected so that only the parties themselves can request the contents of the call later.

In principle, there are two different ways of identifying the parties. The simplest example of the first method of identification is "calling number registration" and "called number registration", with which only the telephone number, fax number and the like of the calling and called parties are stored. Precisely which individual has made the call is then unimportant. Anyone who can identify himself with the "calling number" or "called number" can later request the contents of the stored call. Of course, this provides only a limited protection because no direct relative relationship can be established by this means between the individual who has made the call and the identification. A second form of identification is coupled to the parties themselves. In this case, the parties provide the identification themselves. This can be done, for example, by means of passwords, pin codes, cryptographic keys, smart cards (if use is made of communication appliances with which smart cards can be read in), etc. These latter means are, however, still not unique to the actual parties: anyone who knows how to acquire the passwords, the pin code, the cryptographic key and/or the smart card can then request the contents of the call later. The most direct coupling of identification to the party himself is via biometric identification, in which a recording is made of the voice of the party, a finger print, an odour print or the like.

In step 202, a symmetrical conversation key $S_S$ is agreed by the parties. There are various procedures for agreeing a symmetrical conversation key $S_S$ between different appliances. The most obvious procedure within the scope of the invention is the following. One of the appliances of one of the speakers generates a random symmetrical conversation key $S_S$. Said speaker, or the associated appliance, then requests the public key of all the parties which are stored, for example, in the memory 11 of the telecommunication means 10. After receipt of the public key, the symmetrical conversation key $S_S$ generated is then sent enciphered with the public key to the other parties. The other parties then decipher the received symmetrical conversation key $S_S$ using their private keys.

In step 203, the processor 12 of the telecommunication means 10 store the identity of the parties, preferably in enciphered form, in the memory 11. This can be shown symbolically by $E_S(ID_i)$. In this connection, the E indicates the coding (encrypting), the S the key used in this connection and $ID_i$ the identity of the party i (i=1, 2, 3, . . . ). The key S may be the symmetrical conversation key $S_S$ agreed by the parties, but this does not have to be the case.

In step 204, the date and the time at which the call takes place are optionally stored in memory 11, preferably in enciphered form. This is symbolically shown by $E_S(D;T)$. Here, D and T stand for date and time. Here, again, the abovementioned conversation key $S_S$ can also be used for the encipherment. Any other key may, however, be used instead of the latter.

In step 205, the contents of the call between the parties is stored in memory 11 in enciphered form. This is shown symbolically by $E_S(M)$. Here, M indicates the contents of the call. In the embodiment according to FIG. 2, the call is enciphered directly at the premises of the parties themselves using the symmetrical conversation key $S_S$. Said encipherment therefore then no longer needs to be carried out by the processor 12. The processor 12 then only has to digitally store the contents of the data exchanged between the parties via the monitoring link 13. Since the contents of the call are already being despatched in enciphered form via the telecommunication network 5, the protection is particularly great: the true contents are not accessible even for the manager of the telecommunication means 10. This option requires, of course, that the encipherment can take place using the symmetrical conversation key $S_S$ in the communication appliance of the parties. For this purpose, modifications will be necessary to many communication appliances available on the market. On the other hand, in the GSM traffic, use is already made of enciphered calls (to prevent monitoring, for example, by means of scanners). The procedures used in this connection may optionally be used within the scope of the present invention.

In step 206, the parties encipher the symmetrical conversation key $S_S$ they have agreed using their own public keys and also the possible additional keys which have been used for the enciphered recording of the identities (step 203) and of the date and time (step 204). This therefore provides just as many enciphered conversation keys as there are parties. This is shown symbolically by $E_{K_i}(S_S)$, where $K_i$ equals the public key of the party i. As a result of the enciphered storage of the symmetrical conversation key $S_S$, anyone who possesses the correct secret key associated with the public key used in the encipherment and can identify himself is later capable of requesting the contents of the call again. For this purpose, the symmetrical conversation key $S_S$ thus enciphered is despatched by each party to the processor 12, which then stores it in the memory 11 (step 207).

The parties may then discard the agreed symmetrical conversation key (step 208).

In order to ensure the integrity of the stored data, a digital signature will preferably be appended by the processor 12. Optionally, the total information to which the signature has to be appended is abbreviated for this purpose.

In order to shorten the length of the total information stored and to increase the protection further, the processor 12 preferably generates a hash over all the stored data except the enciphered symmetrical conversation key. Symbolically, this can be shown by the generation of a hash over:

$$C=E_S(ID_i); E_S(D;T); E_S(M)$$

It goes without saying that, in this connection, $E_S(D;T)$ is omitted if the date and time are not stored.

After the generation of the hash, the processor 12 signs the hash using a secret key which is associated with the manager of the telecommunication means 10. The hash thus signed is stored. This is shown symbolically by $S_{Kptt}(C)$. Here, $K_{ptt}$ stands for the secret key of the manager of the telecommunication means 10, which is PTT Telecom in the Netherlands.

The generation of the hash and the signing thereof by the processor 12 is indicated in block 209.

Optionally, i.e. if the communication appliances of the parties are capable thereof, step 210 is then carried out. In step 210, the communication appliances of the speakers also generate a hash over C. Said hash may be different from the hash generated by the processor 12 in step 209, but may also be the same. The callers then sign the hash using their secret keys. This is indicated symbolically by $S_{Ki}(C)$. There are therefore just as many $S_{Ki}(C)$ as there are parties.

The signing of the stored data, whether or not after a hash has been generated thereover, is a protection against the alteration of the contents of the recorded call by the processor 12, as shown in step 209. In this sense, the signing from step 209 is to be interpreted as the signing by a notary.

Although FIG. 1 indicates that the telecommunication means 10 are, as it were, situated outside the telecommunication network 5, they can equally well form part of it. The representation shown is only one way of showing the model. It is likewise not necessary per se that the memory 11 is situated outside the processor 12 and that the memory 11 is situated within the telecommunication means 10. The memory 11 may possibly even form part of the communication appliances of the parties, for example in the case of computer telephony integration (CTI), even though a few access problems then also have to be solved.

For the storage of the data, use may be made of all known ways of digitally storing data. In this connection, use can also be made of solid-state recorders and/or credit-card-sized memory modules.

Figure 3:
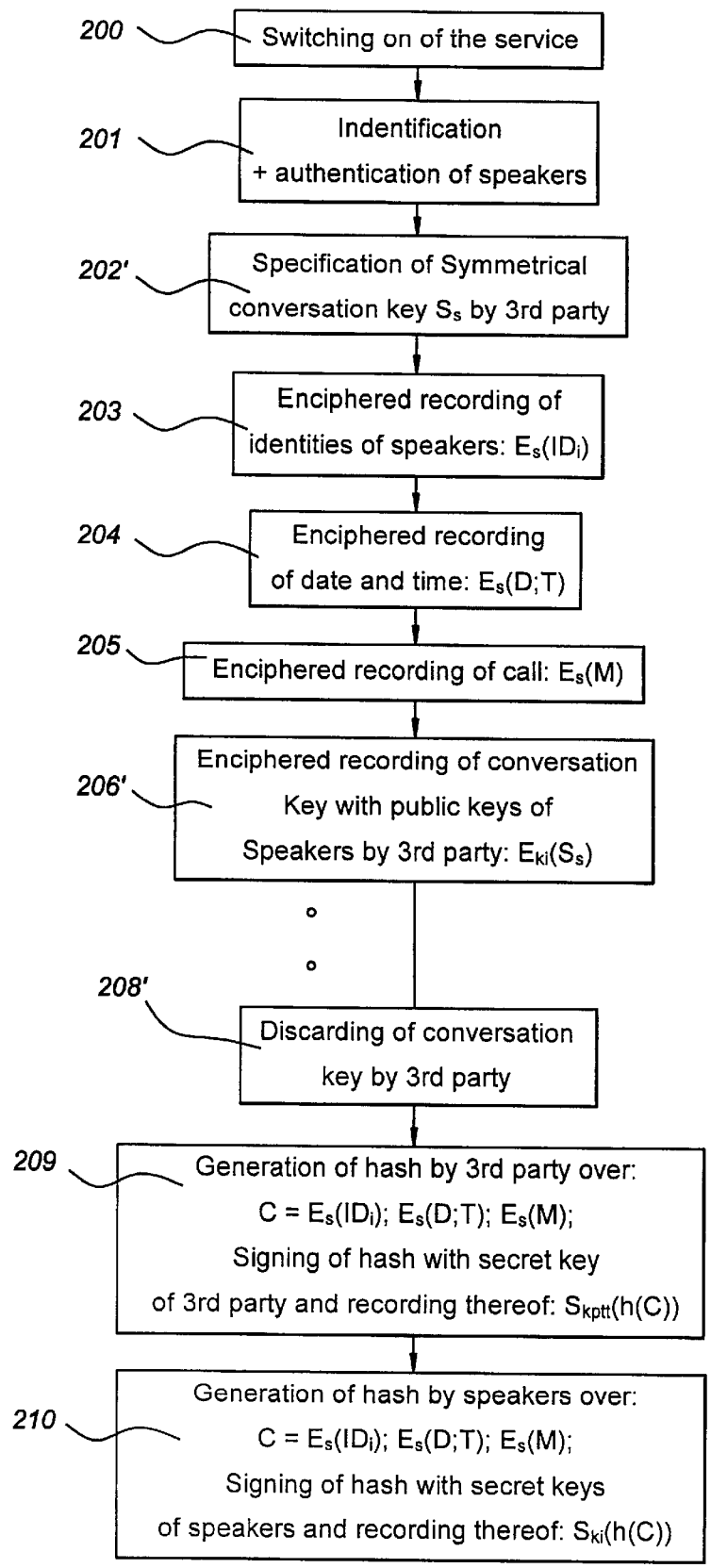
FIG. 3 shows an alternative block diagram of the method according to the invention, in which the symmetrical conversation key is specified by the third party.

FIG. 3 shows a flow diagram of an alternative method according to the invention. In this diagram, the same reference numerals refer to the same steps as in FIG. 2.

The alternative method according to FIG. 3 proceeds from the fact that the symmetrical conversation key $S_S$ used cannot be specified by the parties because, for example, in some cases the means for doing so are still lacking. In that case, the symmetrical conversation key $S_S$ is specified by the manager of the telecommunication means 10, i.e. via the processor 12. This is shown in step 202'.

Because the symmetrical conversation key $S_S$ is specified in this case by the processor 12, the processor 12 receives the contents of the call between the parties directly via the monitoring link 13. The processor 12 must therefore encipher the symmetrical conversation key $S_S$ using the public keys of the partners: $E_{Ki}(S_S)$. This is shown in step 206'.

Since the processor 12 has specified the symmetrical conversation key, it must be part of the service that the symmetrical conversation key is discarded by the processor 12 after step 206' (step 208'). This will have to be specified by means of a contract.

Since the conversation key has been specified by the processor 12, step 207 from the diagram according to FIG. 2 will be missing in FIG. 3: after all, the parties no longer encipher the symmetrical conversation key, but the processor 12 does this itself.

As a result of the way in which the data have been stored, only the parties and not, for example, the manager of the telecommunication means 10, can request the stored data. Only someone who can identify himself with his identity code $ID_i$ will be able to obtain access to the stored data.

After the data have been requested by an authorized individual or by an authorized communication appliance, the stored data can be made available in various forms. The data may, for example, be delivered to an E-mail box, despatched via the Internet, played back audibly via telephone, sent on paper (via fax or letter) and/or via a cassette/CD and the like by post. For this purpose, use can be made of all the known procedures for converting data in one form into another form, for example from speech to writing or vice versa. To request the stored data, the following possibilities may, for example, be used:

1. when the recording is terminated, a unique identification number of the stored call plus a personal access code is given to all the participants in the call; both the unique identification number of the stored call and the personal access code are then needed later to request the call via the telephone network in unenciphered form; this is a simple method;
2. if the communication appliances are equipped with encipherment and deciphering means, for example in combination with a chip card, a speaker can request an enciphered call by means of an identification number and decipher and monitor the enciphered call on his own communication appliance, that is to say locally;
3. as a particularization of possibility 2, it is possible to conceive the deciphering of recorded calls of one client via the Internet by means of a WW browser. Any identification of the client takes place in that case, for example, by means of his private key; the recorded calls are either played over the Internet via a protected link, for example SSL, or despatched still in enciphered form and locally deciphered and played;
4. calls recorded for one client are collected by the telecommunication means 10 of the third party and sent to the client on a CD-ROM or the like.

It will be clear that various alterations can be made without departing from the scope of the invention. In order furthermore to guarantee that the speakers do not just sign something at the end of the call but specifically the call which has just ended, provision can be made that the parties append their signature over the signature appended by the processor 12 over the stored data.

What is claimed is:

1. Method for protected storage of data from message traffic taking place between at least two communication appliances (1, 2, 3, 7, 8, 9), comprising the following steps:
   a. setting-up of a telecommunication link to dispatch said data between at least a first communication appliance (1, 2, 3) and a second communication appliance (7, 8, 9);
   b. setting-up of a monitoring link (13) between the telecommunication link and telecommunication means (10) of a third party;
   c. storage of a first identity of either a first user of the first communication appliance (1, 2, 3) or of the first communication appliance (1, 2, 3) and a second identity of either a second user of the second communication appliance (7, 8, 9) or of the second communication appliance (7, 8, 9) by the telecommunication means (10) of the third party;
   d. encipherment of the data using a symmetrical conversation key to render enciphered data;
   e. storage of the enciphered data by the telecommunication means (10) of the third party,
   f. storage of the symmetrical conversation key enciphered using public keys of the first and second users by the telecommunication means (10) of the third party;

g. signing of said enciphered data and also of the stored first and second identities by the telecommunication means (10) of the third party.

2. Method according to claim 1, wherein, in step c., the storage takes place using a first key which may be identical to the symmetrical conversation key (S).

3. Method according to claim 1, including the following steps:
- c'. in step c., date and time of the message traffic are in addition stored in enciphered form;
- g'. in step g., the enciphered stored date and time are in addition signed by the telecommunication means.

4. Method according to claim 3, including the following step:
- g". in step g., a hash is generated by the telecommunication means (10) over the enciphered data and also the first and second identities stored in enciphered form and the date and time stored in enciphered form after which the hash is signed by the telecommunication means (10).

5. Method according to claim 3, including the following further step:
- h. signing of the enciphered data by the at least first communication appliance (1, 2, 3) and second communication appliance (7, 8, 9) and also of the first and second identities stored in enciphered form and the date and time of the message traffic stored in enciphered form, after which the telecommunication means (10) of the third party stores all of the data thus signed.

6. Method according to claim 5, including the following step:
- h'. in step h., a hash is first of all generated by the telecommunication means (10) over the enciphered data and also the first and second identities stored in enciphered form and the date and time stored in enciphered form, after which the hash is signed by the at least first (1, 2, 3) and second (7, 8, 9) communication appliances using their own private keys.

7. Method according to claim 1, including the following step:
- g'. in step g., a hash is generated by the telecommunication means (10) over the enciphered data and also the first and second identities stored in enciphered form, after which the hash is signed by the telecommunication means (10).

8. Method according to claim 1, including the following further step:
- h. signing by the at least first communication appliance (1, 2, 3) and second communication appliance (7, 8, 9) with private keys of the enciphered data and also of the first and second identities stored in enciphered form, after which the telecommunication means (10) of the third party stores all the data thus signed.

9. Method according to claim 8, including the following step:
- h'. in step h, a hash is first of all generated by the telecommunication means (10) over the enciphered data and also the first and second identities stored in enciphered form, after which the hash is signed by the at least first (1, 2, 3) and second (7, 8, 9) communication appliances using their own private keys.

10. Method according to claim 1, wherein the data from the message traffic are already enciphered by the at least first and second communication appliances (1, 2, 3, 7, 8, 9) using the symmetrical conversation key and, after encipherment using the public keys of the users, the symmetrical conversation key is sent, prior to step f., from the first (1, 2, 3) and the second (7, 8, 9) communication appliances to the telecommunication means (10) of the third party.

11. Method according to claim 1, wherein the telecommunication means (10) provide access to any of the stored data for any user who identifies himself in the correct way.

12. Processor means (12) which are equipped to:
- a. set up a telecommunication link to allow dispatch of data between at least a first communication appliance (1, 2, 3) and a second communication appliance (7, 8, 9);
- b. set up a monitoring link (13) between the telecommunication link and the processor means (12);
- c. store a first identity of either a first user of the first communication appliance (1, 2, 3) or of the first communication appliance (1, 2, 3) and a second identity of either a second user of the second communication appliance (7, 8, 9) or of the second communication appliance (7, 8, 9);
- d. encipher the data using a symmetrical conversation key to render enciphered data;
- e. store the enciphered data,
- f. store the symmetrical conversation key enciphered using public keys of the first and second users;
- g. sign the enciphered data as well as the stored first and second identities.

13. Processor means according to claim 12, wherein they are also designed to perform said storage in step c. using a first key which may be identical to the symmetrical conversation key (S).

14. Processor means according to claim 13, wherein they are also equipped to:
- h. send the enciphered data and also the first and second identities stored in enciphered form to the at least first communication appliance (1, 2, 3) and second communication appliance (7, 8, 9) and then to receive said data back again after they have been signed by the at least first communication appliance (1, 2, 3) and second communication appliance (7, 8, 9) using private keys.

15. Processor means according to claim 14, wherein they are also equipped to:
- h'. first of all generate in step h. a hash over the enciphered data and also the first and second identities stored in enciphered form, and to send the hash to the at least first (1, 2, 3) and second (7, 8, 9) communication appliances in order to allow signing of the hash using the private keys.

16. Processor means according to claim 12, wherein they are also equipped to:
- c'. store in enciphered form in addition date and time of the message traffic in step c. using a second key, which second key may be identical to the symmetrical conversation key (S);
- g'. sign in addition the date and time stored in enciphered form in step g.

17. Processor means according to claim 16, wherein they are also equipped to:
- g". generate a hash in step g. over the enciphered data and also the first and second identities stored in enciphered form and the date and time stored in enciphered form, and then to sign the hash.

18. Processor means according to claim 16, wherein they are also equipped to:
- h. send the enciphered data and also the first and second identities stored in enciphered form and the date and time of the message traffic stored in enciphered form to the at least first communication appliance (1, 2, 3) and second communication appliance (7, 8, 9), and then to receive back again and store said data after they have been signed by the at least first communication appliance (1, 2, 3) and second communication appliance (7, 8, 9) using private keys.

19. Processor means according to claim 18, wherein they are also equipped to:

h'. first of all generate a hash in step h. over the enciphered data and also the first and second identities stored in enciphered form and the date and time stored in enciphered form, and to send the hash to the at least first (1, 2, 3) and second (7, 8, 9) communication appliance to allow the hash to be signed using their own private keys.

20. Processor means according to claim 12, wherein they are also equipped to:

g'. generate a hash in step g over the enciphered data and also the first and second identities stored in enciphered form, and then to sign the hash.

21. Processor means according to claim 12, wherein the processor means are equipped to receive the data after they have already been enciphered by the at least first and second communication appliances (1, 2, 3, 7, 8, 9) using the symmetrical conversation key and for receiving the symmetrical conversation key of the first (1, 2, 3) and the second (7, 8, 9) communication appliances in a form enciphered using public keys of the users prior to step f.

22. Processor means according to claim 12, wherein the processor means are equipped to give access to any of the stored data to any user who identifies himself in the correct way.

* * * * *